(12) United States Patent
Enniss (10) Patent No.: US 10,711,907 B2
(45) Date of Patent: Jul. 14, 2020

(54) LINE REPLACEABLE CONTROL VALVE POSITIONER/CONTROLLER SYSTEM

(71) Applicant: BLACK DIAMOND ENGINEERING, INC., Bluffdale, UT (US)

(72) Inventor: Dan O. Enniss, Bluffdale, UT (US)

(73) Assignee: BLACK DIAMOND ENGINEERING, INC., Bluffdale, UT (US)

( * ) Notice: Subject to any disclaimer, the term of this patent is extended or adjusted under 35 U.S.C. 154(b) by 129 days.

(21) Appl. No.: 16/180,897

(22) Filed: Nov. 5, 2018

(65) Prior Publication Data

US 2019/0136997 A1 May 9, 2019

Related U.S. Application Data

(60) Provisional application No. 62/582,683, filed on Nov. 7, 2017.

(51) Int. Cl.
*F16K 43/00* (2006.01)
*F16K 27/00* (2006.01)
*F16K 27/02* (2006.01)
*F16K 31/126* (2006.01)

(52) U.S. Cl.
CPC ............. *F16K 27/00* (2013.01); *F16K 27/02* (2013.01); *F16K 31/126* (2013.01)

(58) Field of Classification Search
CPC ....... F16K 27/00; F16K 37/00; F16K 37/0066
See application file for complete search history.

(56) References Cited

U.S. PATENT DOCUMENTS

| | | | |
|---|---|---|---|
| 3,565,391 A | | 2/1971 | Zannini et al. |
| 4,633,897 A | * | 1/1987 | Effenberger ............ F16K 27/00 137/315.35 |
| 4,687,179 A | * | 8/1987 | Smith ..................... E21B 34/02 251/56 |
| 5,178,187 A | | 1/1993 | Raymond et al. |
| 5,223,822 A | | 6/1993 | Stommes et al. |
| 5,278,530 A | | 1/1994 | Zovath |
| 5,623,963 A | | 4/1997 | Stommes et al. |
| 5,647,396 A | | 7/1997 | Stommes et al. |

(Continued)

FOREIGN PATENT DOCUMENTS

| | | |
|---|---|---|
| CN | 103672099 | 3/2014 |
| CN | 104565506 | 4/2014 |

(Continued)

OTHER PUBLICATIONS

International Search Report and Written Opinion cited in PCT/US2018/059342 dated Jan. 17, 2019.
"NDX Intelligent Valve Controller Quick Guide" *Metso*. Sep. 2016.

*Primary Examiner* — Reinaldo Sanchez-Medina
(74) *Attorney, Agent, or Firm* — Workman Nydegger (57) ABSTRACT

The present disclosure describes embodiments of control valve positioner/controller devices, control valve positioner/controller mounting devices, and control valve systems that enable rapid exchange and configuration of a replacement positioner/controller to a control valve system. Embodiments allow for rapid replacement of faulty/failed control valve positioners/controllers to minimize production downtimes and associated costs.

20 Claims, 6 Drawing Sheets

(56) References Cited

U.S. PATENT DOCUMENTS

| | | | |
|---|---|---|---|
| 6,135,147 A * | 10/2000 | Peters | F16K 37/0008 |
| | | | 137/552 |
| 6,422,532 B1 | 7/2002 | Garner | |
| 7,219,691 B2 | 5/2007 | Gethmann et al. | |
| 7,609,056 B2 | 10/2009 | Junk et al. | |
| 8,424,563 B2 | 4/2013 | Haller et al. | |
| 8,967,196 B2 | 3/2015 | Ha et al. | |
| 8,985,137 B2 * | 3/2015 | Burgett | F16K 27/0281 |
| | | | 137/315.28 |
| 9,041,549 B2 | 5/2015 | McCarty | |
| 9,518,676 B2 | 12/2016 | Feinauer et al. | |
| 9,562,623 B2 | 2/2017 | Clark et al. | |
| 2005/0040355 A1 | 2/2005 | Williams | |
| 2006/0272710 A1 * | 12/2006 | Minervini | F16K 37/0033 |
| | | | 137/487.5 |
| 2007/0034264 A1 | 2/2007 | Kunz et al. | |
| 2007/0262029 A1 | 11/2007 | Yoshida | |
| 2008/0092960 A1 | 4/2008 | Manecke et al. | |
| 2009/0088906 A1 | 4/2009 | Minervini | |
| 2011/0001070 A1 * | 1/2011 | Wilke | F16K 37/0066 |
| | | | 251/129.03 |
| 2016/0258550 A1 | 9/2016 | Van Diessen et al. | |
| 2017/0082467 A1 | 3/2017 | Nelson et al. | |
| 2019/0063630 A1 * | 2/2019 | Homma | F16K 27/00 |

FOREIGN PATENT DOCUMENTS

| | | |
|---|---|---|
| CN | 105276280 | 1/2016 |
| DE | 202016006837 | 12/2016 |
| EP | 2696122 | 2/2014 |
| WO | WO8401445 | 4/1984 |
| WO | WO2014039465 | 3/2014 |

\* cited by examiner

LINE REPLACEABLE CONTROL VALVE POSITIONER/CONTROLLER SYSTEM

CROSS-REFERENCE TO RELATED APPLICATIONS

This application claims priority to and the benefit of U.S. Provisional Patent Application No. 62/582,683, filed on Nov. 7, 2017 and titled "Line Replaceable Control Valve Positioner/Controller System," the entirety of which is incorporated herein by this reference.

BACKGROUND

Control valves are widely utilized in process control loops to regulate transmission and distribution of fluids and gases. These devices are used in a variety of different industries. Valve positioners/controllers are critical control valve system components that have varying degrees of physical integration into the control valve actuator. Many control valves, particularly in more complex systems, include integrated valve positioners. This physical integration, which varies by device manufacturer, includes fixed rigid tubing, hard-wired signal connections, and multi-fastener, multi-tool mounting often with limited or difficult access. Proper physical installation and alignment or removal requires an experienced and trained mechanical technician.

Valve positioners/controllers have grown progressively more technologically sophisticated in recent decades and now require a skilled Electrical and Instrument Technician (EIT) to configure, setup, enter correct identification information, and properly tune the valve positioner/controller. This task often requires the use of specialized equipment and advanced training. It is often manufacturer specific and can be extensive.

Typical positioners provide enhanced control and performance of the valve, and improve the responsiveness of the control valve to changes in process conditions. Unfortunately, however, control valve positioners are subject to failure. Failure of a control valve positioner typically requires that the affected process system be shut down (or at least operated at reduced capacity) to allow for repair or replacement of the control valve positioner. The downtime related to such failures often results in costly production delays.

Moreover, the complexity of a typical control valve positioner makes it impractical or impossible to easily repair or replace a failed device. A typical process plant is unlikely to have qualified technicians on staff able to quickly repair or replace the failed device. It is therefore usually necessary for plant managers to contract for outside specialists to remove the failed positioner, repair the positioner, or install a new replacement positioner, and then configure the reinstalled or newly installed positioner to the particular process settings required by the associated control valve. This amounts to additional downtime costs in addition to the costs associated with contracting the outside specialist labor.

There is thus a long felt and ongoing need in the process control industries for an improved control valve positioner system that minimizes plant downtime and its associated costs.

BRIEF SUMMARY

The present disclosure describes embodiments of field or line replaceable modular control valve positioner/controller devices, control valve positioner/controller mounting devices, and control valve systems that enable rapid removal, replacement, and configuration of a new replacement positioner/controller within the control valve system.

The disclosed invention describes an interface concept that changes the critical valve positioner/controller from a fully integrated or partially integrated device into a Line Replaceable Control Valve Controller ("LRVC") that is a true modular component of the control valve system and is designed to be replaced quickly at the operating location following a simple, time efficient, "Remove and Replace" maintenance procedure. Configuration, setup, identification, and tuning settings for the new device can be loaded electronically (digitally) from an independent, passive memory device, coupled to or located proximate to the LRVC, restoring the same extensive digital information stored from the commissioning of the previous, now removed, and possibly electronically dead, valve controller. This restoration function eliminates the need for specialized technical skills to commission the new valve positioner/controller and minimizes the possibility of errors.

LRVCs as described herein can improve and streamline maintenance operations because defective or malfunctioning units can be replaced quickly by in-house technicians with replacement units sourced from in-plant inventories. The control valve system and the process loop can be quickly restored to service, thereby minimizing lost production and corresponding lost revenues. The defective, malfunctioning, or otherwise unserviceable valve positioner/controller can undergo testing, evaluation, and repair at a specialized shop facility by highly trained technicians or by returning it to the original equipment manufacturer (OEM). This can be done without having to shut down the entire manufacturing system or subsystem for lengthy periods of time because the defective valve positioner/controller can be replaced in the interim with a new replacement unit in matter of minutes or a few hours. For example, replacement and programming/tuning may take about 3 minutes to about 3 hours, or about 4 minutes to about 2 hours, or about 5 minutes to about an hour. In some circumstances the total time to replace and reprogram/tune the positioner may be less than an hour such as about 3 to 45 minutes or about 4 to 30 minutes or about 5 to 15 minutes. This is in stark contrast to conventional positioner replacement, which often takes more than an hour even with a skilled technician and reprogramming information on hand. Replacement may even be on the order of several hours if the technician has to search out configuration information and/or experiment with the tuning setup of the new positioner.

In one embodiment, a control valve system includes a pneumatic actuator assembly, a positioner, and a mounting device. The mounting device includes a manifold that receives tubing/piping connections from an air supply and from the pneumatic actuator assembly. The connections allow the mounting device to function as an attachment point for easily and rapidly integrating the positioner within the control valve system. Once the mounting device has been properly attached to the actuator assembly, and once the proper connections have been made to the manifold, the mounting device functions as a dock for receiving the positioner/controller. The manifold is configured to engage with pneumatic ports of the positioner to pneumatically connect the air supply and actuator to the positioner/controller.

Certain embodiments may also include a signal connector. The signal connector may be attached to the positioner/controller at a corresponding signal port of the positioner/controller. The signal connector includes an attachment point which may be configured as a quick connect fitting for forming a rapid attachment to the corresponding signal port of the positioner/controller and/or to desired instrumentation and/or electrical connections passed through an instrumentation conduit. The attachment point may be formed, for example, as a "push fitting" (e.g., industrial-type, ARO-type, automotive-type) capable of being quickly connected or disconnected by hand (e.g., without requiring wrenches). Signal connection can be both quick connect and also sealed for environmental and hazardous area considerations. A threaded mate-up may additionally or alternatively be utilized in some embodiments. Desired instrumentation and/or electrical connections may be made to the signal connector to rapidly bring them into connection with the positioner/controller.

In use, when a positioner/controller failure has been determined or is reasonably likely, the faulty or potentially faulty positioner/controller may be detached from the signal connector and undocked from the mounting device. A replacement positioner/controller may then be quickly attached by docking to the mounting device and connecting to the signal connector. This procedure can be accomplished relatively rapidly (in a matter of minutes) without the need to size, cut, and attach fixed pneumatic tubing or electrical/instrumentation wiring. In addition, the replacement procedure may be completed by in-house plant staff without the need for outside specialists (and without the associated delay). The quick replacement procedure limits process downtime and allows the process and/or plant to get back online faster, limiting the associated downtime costs.

Certain embodiments also include features enabling rapid configuration and/or setup of a replacement positioner/controller once it has been properly inserted. A passive memory device, preferably provided in a hermetically sealed container, may be communicatively coupled to the positioner/controller to record and store a backup of positioner/controller configuration/setup and identification information. The memory device is preferably stored external from the positioner/controller. For example, the memory device may be attached to an outer surface of the positioner/controller or to an outer surface of the pneumatic actuator. Upon failure of the positioner/controller, the memory device is advantageously available and readily findable to quickly, efficiently, and accurately restore configuration/setup information to the replacement positioner/controller. The relatively rapid transmission of configuration/setup information minimizes or eliminates the need for post-replacement control loop tuning and other post-replacement testing. This further reduces downtime and can avoid or minimize the need to wait for specialized technicians to apply the proper settings.

In alternative embodiments, one or more of the rapid exchange components may be integrally built into the positioner/controller itself. For example, an exemplary positioner/controller may include an integral manifold assembly allowing the pneumatic connections to be directly made to the positioner/controller via quick connect fittings (i.e., "push fittings") without the use of a mount plate. Additionally, or alternatively, a positioner/controller may include quick connect fittings for directly receiving desired electrical and instrumentation connections without the use of a signal connector.

Additional features and advantages will be set forth in part in the description that follows, and in part will be obvious from the description, or may be learned by practice of the embodiments disclosed herein. The objects and advantages of the embodiments disclosed herein will be realized and attained by means of the elements and combinations particularly pointed out in the appended claims. It is to be understood that both the foregoing brief summary and the following detailed description are exemplary and explanatory only and are not restrictive of the embodiments disclosed herein or as claimed.

BRIEF DESCRIPTION OF THE DRAWINGS

In order to describe various features and concepts of the present disclosure, a more particular description of certain subject matter will be rendered by reference to specific embodiments which are illustrated in the appended drawings. Understanding that these figures depict just some example embodiments and are not to be considered to be limiting in scope, various embodiments will be described and explained with additional specificity and detail through the use of the accompanying drawings in which.

DETAILED DESCRIPTION

The present disclosure describes embodiments of modular control valve positioner/controller devices, modular control valve positioner/controller mounting devices, and control valve systems that enable rapid exchange and configuration of a replacement positioner/controller within the control valve system. Embodiments described herein beneficially allow for rapid replacement of faulty/failed control valve positioners/controllers to minimize production downtimes and associated costs. Certain embodiments described herein additionally enable rapid configuration of the replacement positioner/controller, thereby more quickly bringing the replacement positioner/controller into optimal performance while minimizing positioner/controller tuning and other testing prior to restart of the affected process.

Certain embodiments described herein allow plant technicians to easily replace a failed positioner/controller and easily configure the replacement positioner/controller to the proper settings of the previous positioner/controller that has been replaced. This allows replacement of the positioner/controller to be accomplished without specialized expertise in control valve positioners/controllers, and it allows standard in-house staff to make the needed positioner/controller replacement. The affected process may then be brought back online within minutes or hours without having to wait for specialized experts to arrive, install, and configure the replacement positioner/controller.

Figure 1:
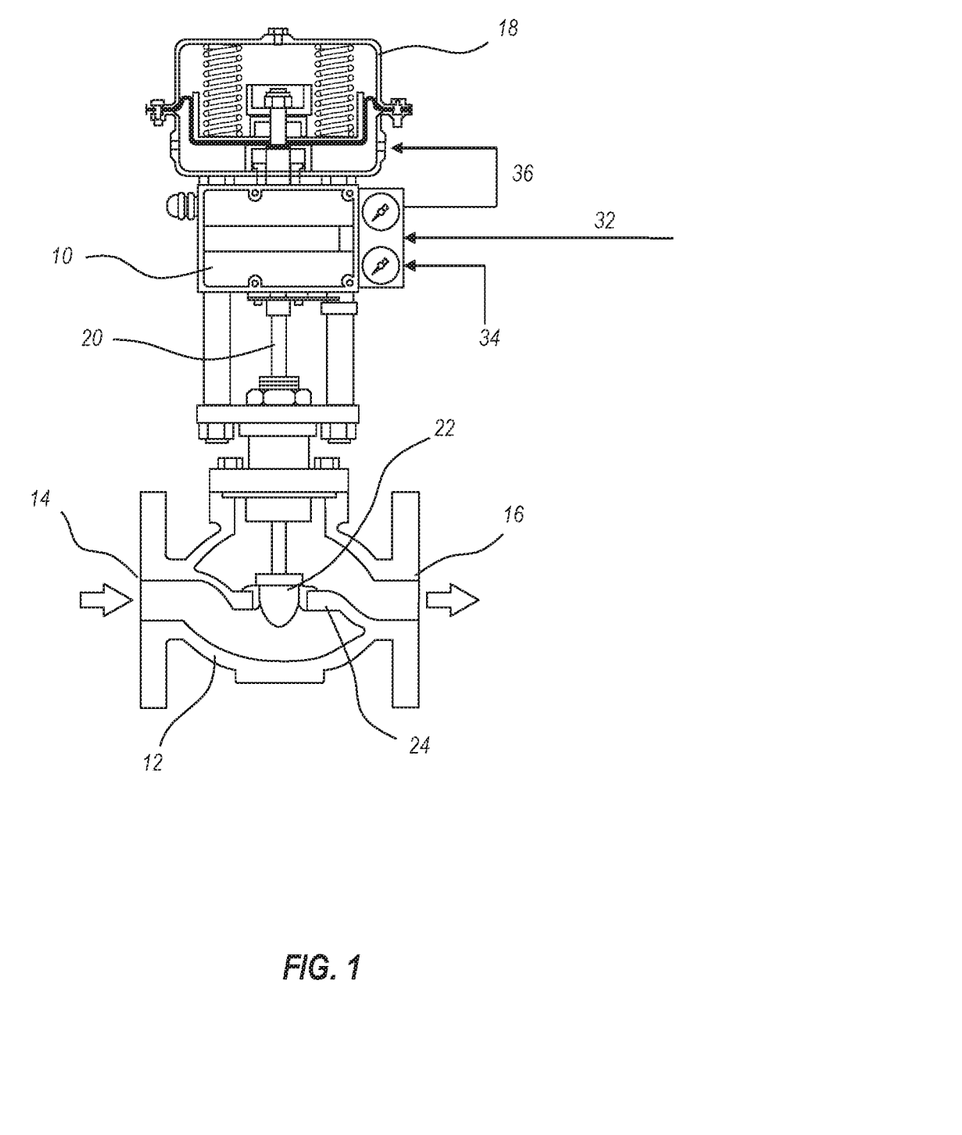
FIG. 1 illustrates a conventional control valve and control valve positioner/controller system.

FIG. 1 illustrates a conventional control valve and control valve positioner/controller system. The illustrated control valve is a globe valve, but it will be recognized that several other types of control valves are also known in the art, such as butterfly valves, ball valves, and other rotary valves, other types of globe valves, angle body valves, gate valves, and diaphragm valves, for example. As shown, a valve body 12 includes an inlet 14, an outlet 16, and a seat 24 positioned between the inlet 14 and the outlet 16. A valve plug 22 is adjustable with respect to the seat 24 to provide variable restriction of fluid flow through the valve body 12. The valve plug 22 is coupled to a first end of a valve stem 20, and the valve stem 20 extends through the valve body 12 to a second end coupled to a pneumatic actuator 18. As fluid pressure within the pneumatic actuator 18 is adjusted, the pneumatic actuator 18 responds by adjusting the height of the stem 20. As the height of the stem 20 is adjusted, the position of the valve plug 22 relative to the seat 24 is also adjusted, thereby adjusting the level of flow restriction through the valve body 12.

The control valve system shown in FIG. 1 also includes a positioner/controller 10 operatively coupled to the pneumatic actuator 18. The positioner/controller 10 is configured to compare the control signal (i.e., the requested valve position) with the actual valve position as provided through a feedback linkage (not shown in FIG. 1). In the illustrated example, the positioner/controller 10 is connected to an air supply 34 and a control signal 32. The positioner/controller 10 receives the control signal 32, and based on the received control signal 32, produces one or more output streams such as output stream 36 which is sent to the pneumatic actuator 18. The positioner/controller 10 therefore controls the position of the valve plug 22 by controlling the pressure within the pneumatic actuator 18. A feedback linkage also typically mechanically connects the positioner/controller 10 to one or more components of the valve assembly to provide information as to the position of the valve to the positioner/controller 10.

In some setups, the control signal 32 is a pneumatic signal generated by an electrical to pneumatic converter (i.e., FP converter). In these configurations, the FP converter is coupled to an air supply, and operates to convert an electrical control signal to a pneumatic control signal. In other setups, the control signal is an electrical signal, and the positioner/controller 10 itself operates to convert the received electrical signals into appropriate pneumatic outputs. Relatively complex control valve systems typically utilize digital or "smart" positioner/controller units that utilize a microprocessor to control the valve actuator and to monitor and record operational data.

Other control valve setups may vary from the illustrated example, such as by utilizing different valve actuator types (e.g., non-pneumatic), different valve configurations (e.g., globe valve, gate valve, rotary valve, butterfly valve, diaphragm valve, and/or ball valve configurations), different positioner/controller connections or positions, and/or utilizing other types of control valve components or modifications as known in the art.

Despite potential differences in these types of design details, many if not all control valve systems are setup with the positioner/controller fully integrated to the valve system. For example, the various pneumatic input and output lines may be connected to the positioner/controller using solid piping, the electrical and instrumentation connections may be manually wired to the positioner/controller, and the positioner/controller itself may be affixed to the pneumatic actuator in a manner that makes it uneasy to detach.

At first blush, the robust integration of the positioner/controller to the control valve system appears to makes sense in light of the critical importance of keeping the control valve in good operation. However, somewhat counter-intuitively, the robustness of the manner by which the positioner/controller is coupled to the valve assembly can make positioner/controller failures more difficult to diagnose and/or remedy. This results in longer process downtime and greater production losses. For example, when a positioner/controller fails, the solid piping must be cut, the manual electrical/instrumentation connections must be severed, and time and labor must be spent to detach the positioner/controller from the valve assembly. Further, when a replacement positioner/controller arrives, considerable time and labor must be spent to attach the new positioner/controller and to reestablish each of the required connections. This type of repair typically requires a high level of expertise, which may not be shared by any employees at a production plant or even within an entire organization.

In addition, even after a replacement positioner/controller has been installed with all required connections, further time and effort must be expended in order to setup and configure the replacement positioner/controller for the particular process in which it is to be implemented. This can often require testing by those with specialized training with control valve positioners/controllers, with the particular process involved, and/or with the particular positioner/controller or control valve at issue. Multiple rounds of process startup and shutdown may be required, all of which further add to downtime and costly production delays.

Figure 2:
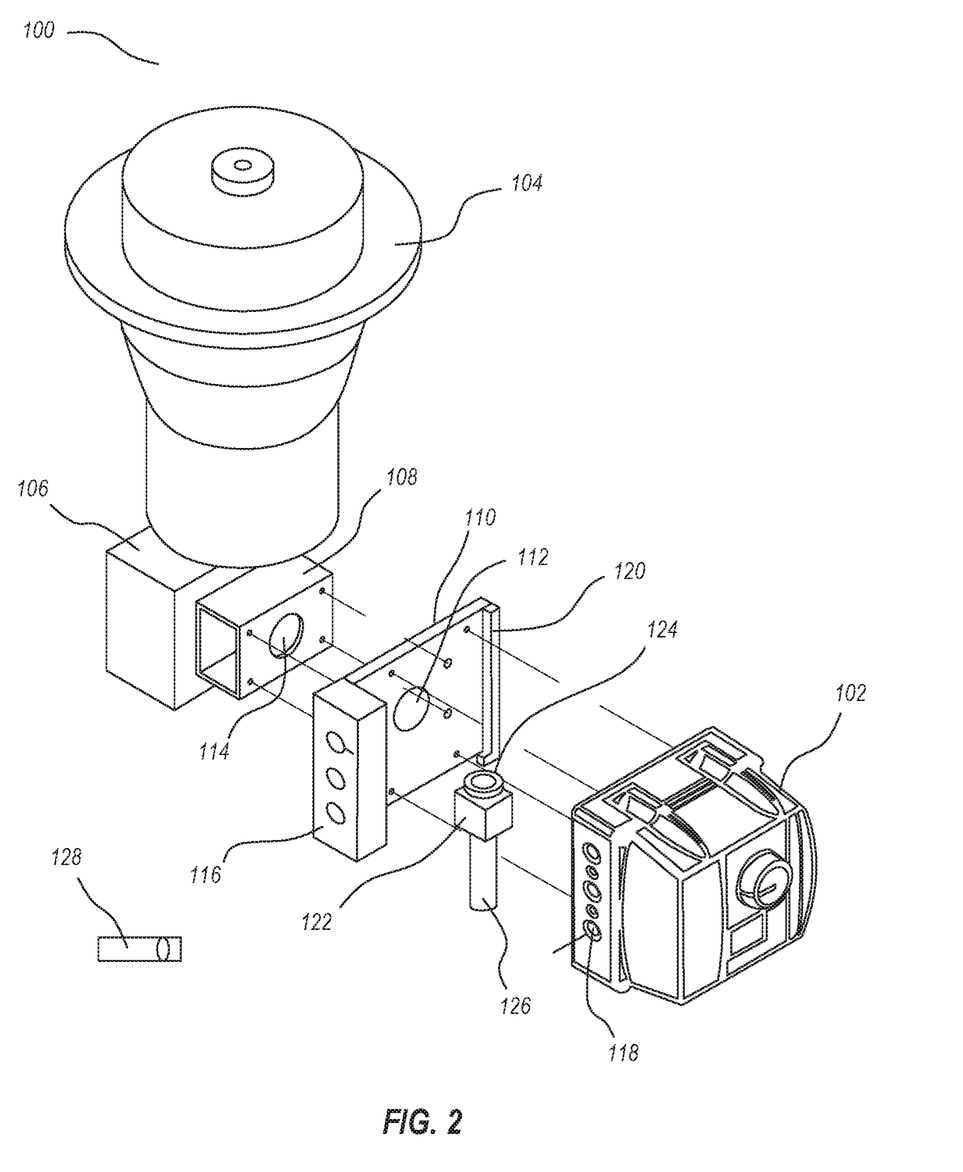
FIG. 2 illustrates, in exploded view, an improved control valve system including a controller (i.e., an LRVC) configured for rapid exchange of a replacement positioner/controller.
Figure 3:
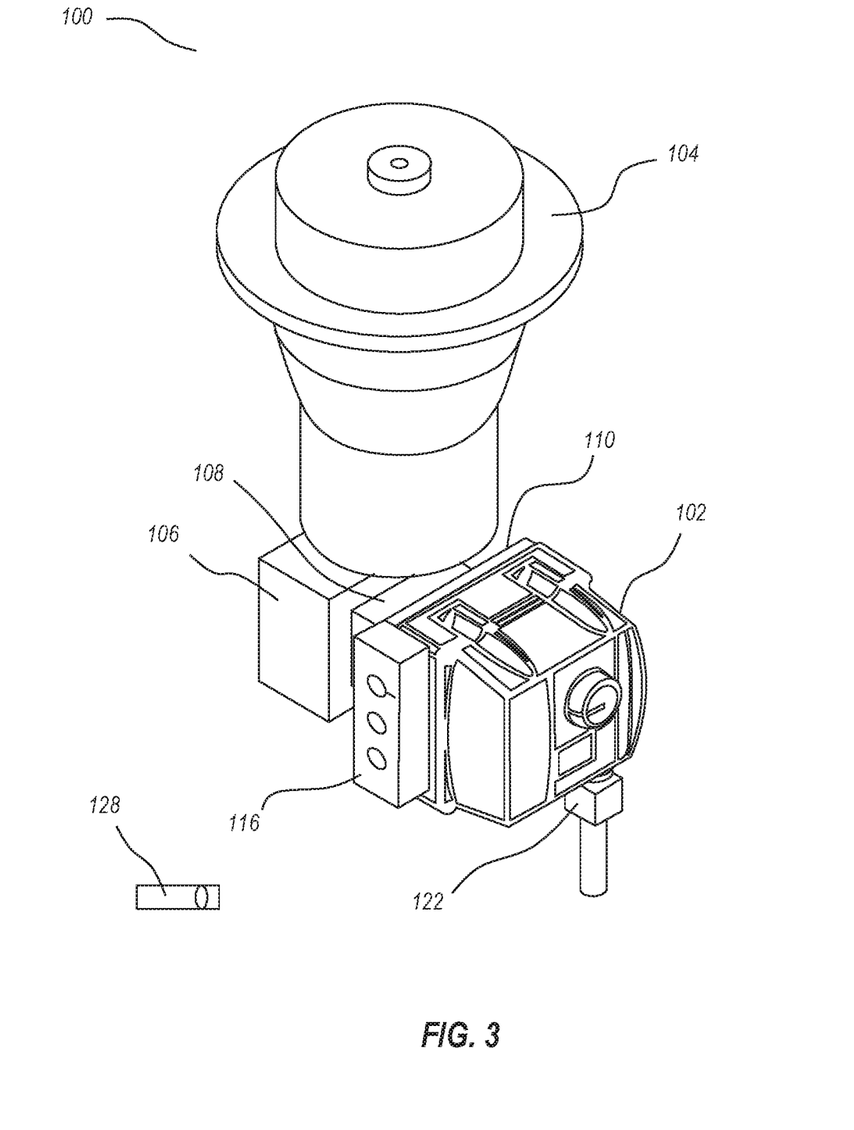
FIG. 3 illustrates the improved control valve system of FIG. 2 in standard perspective view.

FIGS. 2 and 3 illustrate, in exploded and standard views, respectively, an improved modular valve system 100 configured for rapid exchange of a valve positioner/controller 102. The illustrated valve system 100 solves one or more of the problems associated with the valve system of FIG. 1 described above. As shown, the valve system 100 includes an actuator assembly having a pneumatic actuator 104 and transfer case 106 (used for rotary valve implementations). The actuator assembly couples to a valve body (not shown in this view). A mounting spacer 108 is coupled to the transfer case 106. The mounting spacer 108 provides structure for attaching the mount plate 110 while also providing sufficient clearance between the actuator 104 and the mount plate 110 to allow for a feedback linkage to extend from the transfer case 106 to the positioner/controller 102. In alternative embodiments, such as those not including a transfer case 106, the mounting spacer 108 may be omitted or may be attached to the body of the actuator 104.

The mounting spacer 108 and the mount plate 110 each include respective apertures 112 and 114 that are positioned so as to align with one another when the mount plate 110 is attached to the spacer 108. The aligned apertures 112 and 114, which thereby provide passage from the positioner/controller 102 to the actuator 104 and transfer case 106, allowing for connection of a feedback linkage (not shown).

The illustrated mount plate 110 includes a manifold 116 having two sets of pneumatic connection points. The outer set of connection points are configured for connecting to the actuator 104, an air supply (not shown), and any other optional or desired pneumatic connections. The inner set of connection points (on the side facing the positioner/controller 102) function to connect the manifold 116 to corresponding ports 118 of the positioner/controller 102. The mount plate 110 may be configured for permanent attachment to the actuator assembly. For example, the connections from the air supply and the actuator 104 to the manifold 116 may be made using fixed tubing.

The inner set of connection points may be configured to be spring and/or pressure actuated. For example, the manifold 116 may not be actuated until the positioner/controller 102 is properly positioned and engaged against the manifold 116 such that the positioner/controller ports 118 align and engage with the inner connection points of the manifold 116.

The control valve system 100 shown in FIGS. 2 and 3 differs from the typical setup shown and described in FIG. 1 because the connections from the actuator 104 and air supply are not made directly to the ports 118 of the positioner/controller 102. Rather, the manifold 116 of the mount plate 110 receives the connections, and the mount plate 110 itself then functions as an attachment point for easily and rapidly integrating the positioner/controller 102 with the rest of the control valve system 100. Once the mount plate 110 has been properly attached to the actuator assembly, and once the proper connections have been made to the manifold 116, the mount plate 110 functions as a dock for receiving the positioner/controller 102. The manifold 116 is configured to engage with the ports 118 of the positioner/controller 102 to transfer the air supply and actuator 104 connections to the positioner/controller 102.

The mount plate 110 may also include an indexing shoe 120 providing for proper alignment and positioning of the positioner/controller 102 to the mount plate 110. The indexing shoe 120 functions to secure the positioner/controller 102 against the manifold 116 during insertion of the positioner/controller 102, and provides for proper attachment of the positioner/controller ports 118 to the corresponding connections of the manifold 116.

The illustrated control valve system 100 also includes a signal connector 122. The signal connector 122 may be attached to the positioner/controller 102 at a corresponding signal port of the positioner/controller 102. The signal connector 122 also includes an attachment point 124 configured as a quick connect fitting for forming a rapid attachment to the corresponding signal port of the positioner/controller 102 and/or to desired instrumentation and/or electrical connections passed through an instrumentation conduit 126. The attachment point 124 may be formed, for example, as a "push fitting" (e.g., industrial-type, ARO-type, automotive-type) capable of being quickly connected or disconnected by hand (e.g., without requiring wrenches). Desired instrumentation and/or electrical connections may be made to the signal connector 122 to rapidly bring them into connection with the positioner/controller 102.

In use, when a positioner/controller failure has been determined or is reasonably likely, the faulty or potentially faulty positioner/controller may be detached from the signal connector 122 and undocked from the mount plate 110. A replacement positioner/controller 102 may then be quickly attached by docking to the mount plate 110 and connecting to the signal connector 122. This procedure can be accomplished relatively rapidly without the need to cut fixed tubing or electrical/instrumentation wiring. In addition, the replacement procedure may be completed by typical plant staff without the need for outside specialists. The quick replacement procedure greatly reduces process downtime and allows the process and/or plant to get back online faster, limiting the associated downtime costs.

In some embodiments, replacing a positioner and programming/tuning the newly installed positioner may take about 3 minutes to about 3 hours, or about 4 minutes to about 2 hours, or about 5 minutes to about an hour. In some circumstances the total time to replace and reprogram/tune the positioner may be less than an hour such as about 3 to 45 minutes or about 4 to 30 minutes or about 5 to 15 minutes.

Certain embodiments also include features enabling rapid configuration of a replacement positioner/controller once it has been properly inserted. A passive memory device 128, preferably provided in a hermetically sealed container or dongle, may be communicatively coupled to the positioner/controller 102 to record and store a backup of positioner/controller configuration/setup and identification information. The memory device 128 is preferably stored external from the positioner/controller 102. That is, the passive memory device 128 is not integrated with the internal electronics of the positioner/controller 102. The memory device may be communicatively coupled to the positioner/controller 102 through a suitable wireless connection (e.g., Bluetooth) or through an initial wired/plugged connection (e.g., via the instrumentation conduit 126). The memory device 128 may then be stored electrically disconnected from the positioner/controller 102 so that upon failure of the positioner/controller 102, the memory device is available to quickly restore configuration/setup information to the replacement positioner/controller.

In some embodiments, the memory device is programmed once with positioner/controller information and is then left alone until the positioner/controller needs to be replaced, in which case it is used to quickly reprogram and calibrate the replacement positioner/controller to the same settings as the original positioner/controller. Alternatively, the memory device can be updated from time to time to incorporate additional and/or alternative settings, such as where the positioner/controller is upgraded or recalibrated to a difference in processing conditions.

The relatively rapid transmission of configuration/setup information minimizes or eliminates the need for post-replacement control loop tuning and other post-replacement testing. This further reduces downtime and can avoid or minimize the need to wait for specialized technicians to apply the proper settings. As described above, total replacement and recalibration of the positioner/controller can be accomplished in a matter of minutes.

The embodiment shown in FIGS. 2 and 3 enables rapid exchange of a replacement positioner/controller 102 to the control valve system 100 through rapid connections to the manifold 116 of the mount plate 110 and to the signal connector 122. In some embodiments, these components may be formed to fit and operate with positioners/controllers commonly used in the process control industries. In other embodiments, these components may be custom made to fit a particular line or type of positioner/controller, thereby allowing rapid exchange of that particular line or type of positioner/controller to the associated control valve system.

In alternative embodiments, one or more of the rapid exchange components may be integrally built-in to the positioner/controller itself. For example, an exemplary positioner/controller may include an integral manifold assembly allowing the pneumatic connections to be directly made to the positioner/controller via quick connect fittings (i.e., "push fittings") without the use of a mount plate. Additionally, or alternatively, a positioner/controller may include quick connect fittings for directly receiving desired electrical and instrumentation connections without the use of a signal connector. These types of embodiment may function similarly to the embodiment shown in FIGS. 2 and 3 by allowing rapid exchange of the positioner/controller.

Figure 4:
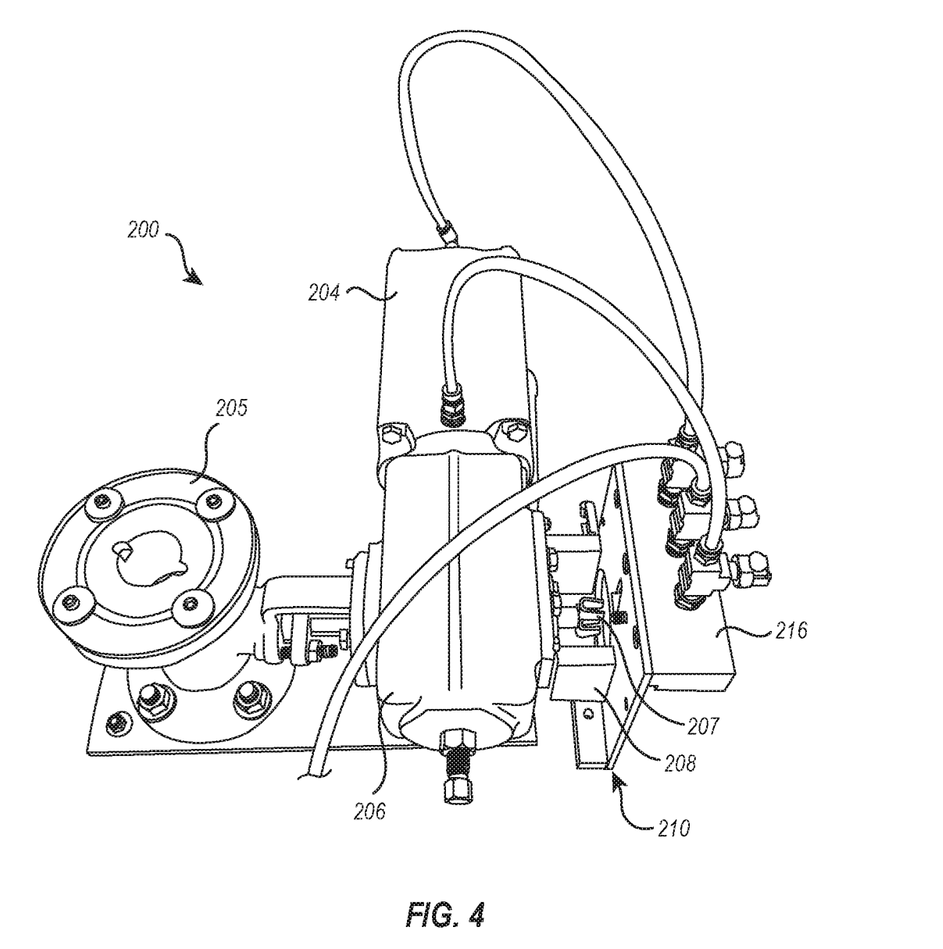
FIG. 4 illustrates another embodiment of an improved control valve system including a controller (i.e., an LRVC) configured for rapid exchange of a replacement positioner/controller.

FIG. 4 illustrates another embodiment of a control valve system 200 configured to enable rapid exchange of a valve positioner/controller. The system 200 may share features with the embodiments described above, and the features described above may therefore be applied to the illustrated control valve system 200.

As shown, the control valve system 200 includes an actuator assembly having a pneumatic actuator 204 coupled to a valve body 205 via a transfer case 206. The control valve as shown here is a rotary valve, though other valve configurations known in the art may also be utilized. A mounting spacer 208 is attached to the transfer case 206 to define a space between the actuator assembly and the mount plate 210.

FIG. 4 shows the feedback linkage 207 where the positioner/controller can couple to the actuator assembly. In this particular valve configuration, the feedback linkage 207 is mechanically coupled to the control valve within the valve body 205 and moves in accordance with the position of the valve. That is, the position of the feedback linkage 207 corresponds to the position of the valve so that position feedback can be provided to the positioner/controller when it is attached to the mount plate 210 and coupled to the feedback linkage 207.

The mounting spacer 208 is shown here as being attached to the transfer case 206. However, in other embodiments, the mounting spacer 208 may be omitted or may be attached to other components of the actuator assembly, such as the body of the pneumatic actuator 204 itself. In particular, different control valve configurations may include different feedback linkage positions and/or orientations, so the mounting components may be moved and rearranged accordingly.

As shown, the mount plate 210 includes a manifold 216 that is pneumatically connected to the actuator assembly and during operation may also be pneumatically connected to an air supply. These connections are intended to be robust and may therefore be formed of fixed tubing, though such fixed tubing is not strictly necessary. As with other embodiments described herein, and as described in more detail below, the manifold 216 includes additional connection points for communicating with pneumatic ports of the positioner/controller when attached. The manifold 216 thereby functions as a dock to pneumatically couple the positioner/controller to the actuator assembly.

Figure 5A:
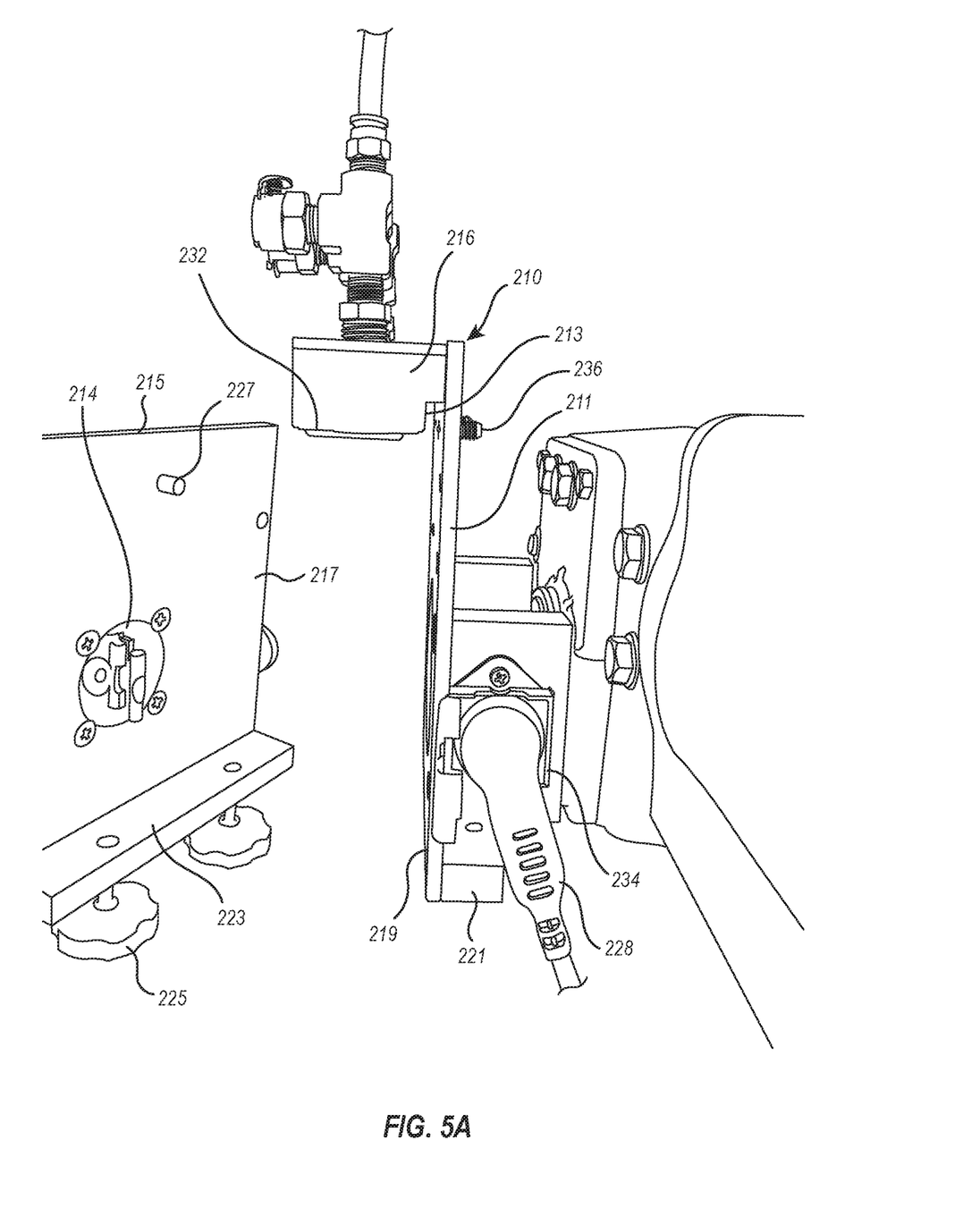
FIGS. 5A and 5B illustrate side and perspective views, respectively, of the control valve system of FIG. 4 showing integration of the positioner/controller with the control valve.
Figure 5B:
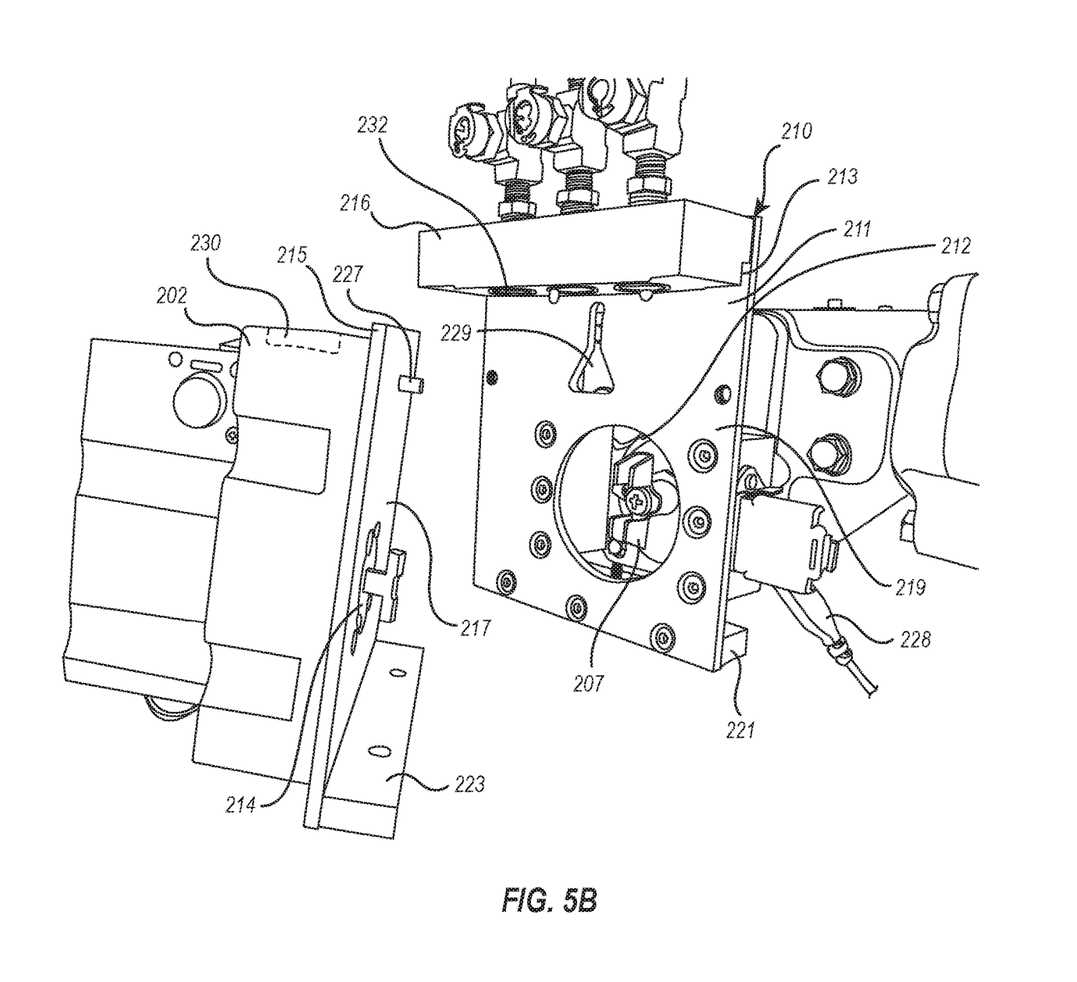

FIGS. 5A and 5B illustrate docking of the positioner/controller 202 to the mount plate 210, with FIG. 5A showing a side view of the system and FIG. 5B showing a perspective view. The mount plate 210 may include a base plate 211. The manifold 216 extends laterally from the base plate 211 and a slot 213 is defined between the base plate 211 and a portion of the manifold 216. The slot 213 is configured in size and shape to receive a flange portion 215 of a back plate 217 coupled to the positioner/controller 202. The slot 213 and flange 215 are configured so that when the flange 215 is received into the slot 213, the ports of the positioner/controller 202 can contact the pneumatic connection points of the manifold 216. Although the illustrated embodiment includes a separate back plate 217 coupled to the positioner/controller 202, other embodiments may omit the back plate and make use of components that are part of or are integrally formed with the positioner/controller 202.

The mount plate 210 may also include a first fastener member 221 coupled to the base plate 211 and a corresponding second fastener member 223 coupled to the back plate 217. When the positioner/controller 202 is properly positioned, the first fastener member 221 and second fastener member 223 are brought sufficiently close to one another to allow for fastening. In the illustrated embodiment, the first fastener member 221 is an extension extending away from an outer surface 219 (i.e., the surface facing towards the positioner) of the base plate 211 so as to avoid interfering with the positioner/controller 202 when it is being attached to the base plate 211.

For example, the positioner/controller 202 and back plate 217 assembly may be contacted against the outer surface 219 of the base plate 211 so that the flange portion 215 of the back plate 217 aligns with the slot 213. The back plate 217 may then be slid "upwards" (i.e., towards the manifold) so that the flange portion 215 enters into the slot 213 and the pneumatic ports of the positioner/controller 202 are brought into contact with the pneumatic connection points of the manifold 216. In this position, the first and second fastening members 221 and 223 are also in contact with one another such that one or more suitable fasteners 225 may be applied to the members 221 and 223 to couple the back plate 217 to the base plate 211. The fasteners 225 may include threaded fasteners that pass through threaded bores in each of the fastening members 221 and 223, as shown. Additionally, or alternatively, the one or more fasteners may include clamps, press-fit connectors, magnets, or other suitable fastening components known in the art.

The base plate 211 includes an aperture 212 that corresponds to an aperture 214 on the back plate 217. Together, the apertures 212 and 214 allow the connections between the positioner/controller 202 and the feedback linkage 207. As best shown in FIG. 5B, the base plate 211 also includes an index aperture 229 and the back plate 217 includes a corresponding index pin 227. The index aperture 229 is shaped with a larger base that narrows closer to the manifold 216. When the back plate 217 is positioned against the base plate 211, the index pin 227 may be inserted into the wider base portion of the index aperture 229. Then, when the positioner/controller 202 is moved further towards the manifold 216, the narrowing index aperture 229 forces the index pin 227, and thus the rest of the back plate 217 and positioner/controller 202, to appropriately center. This ensures proper alignment of the pneumatic ports 230 of the positioner/controller 202 with the pneumatic connection points 232 of the manifold 216. Other embodiments may include additional or alternative indexing means. For example, the positions of the index aperture and index pin may be reversed such that the back plate 217 includes an aperture with a wider upper section and narrower lower section while the base plate 211 includes a corresponding index pin. The back plate 217 and base plate 211 may also include grooves, notches, keyways, or other such indexing structures.

The manifold 216 may also include one or more seals (e.g., O-rings) at the pneumatic connection points 232 to provide an air-tight seal of pneumatic components once the positioner/controller 202 is properly positioned and tightened. Other embodiments may additionally or alternatively include quick-connect and/or push fittings or other suitable pneumatic fittings.

As with embodiments described above, the control valve system 200 may also include a passive memory device 228 configured to record and store positioner/controller configuration information. As shown in FIG. 5A, the system may also include a dock 234 for attaching the memory device 228 directly to the mount plate 210. This conveniently locates the memory device in a readily findable position so that a technician may easily access the device when a replacement positioner/controller is inserted. The dock 234 is shown here as being attached to the mounting spacer 208. Other embodiments may position the dock 234 elsewhere, such as on an inner side of the base plate 211, another portion of the mount plate 210, or even to the actuator assembly itself.

As best shown in FIG. 5A, the mount plate 210 may also include one or more locking elements 236 such as one or more set screws or threaded ball plungers for providing a biasing force against the positioner/controller 202 when mounted. This can aid in reducing movement and/or residual play in the device after mounting.

Although not shown in these views, the control valve system 200 may also include a signal connector for readily making electrical connections to the positioner/controller 202. As described above, the signal connector is preferably formed as a fitting that minimizes or eliminates the need for direct wiring of the electrical components, such as a quick connect fitting, pin connector, threaded connector, or the like.

Although the foregoing has been described in some detail by way of illustrations and examples for purposes of clarity and understanding, it will be understood by those of skill in the art that numerous and various modifications can be made without departing from the spirit of the present disclosure. Therefore, it should be clearly understood that the forms disclosed herein are illustrative only and are not intended to limit the scope of the present disclosure, but rather to also cover all modification and alternatives coming with the true scope and spirit of the invention.

The invention claimed is:

1. A control valve positioner mounting device configured to enable rapid exchange of a control valve positioner in a control valve system, the device comprising:
   a mounting portion including a base plate configured to receive a control valve positioner; and
   a manifold attached to the base plate and including
      a first set of connection points configured to engage with corresponding ports of the valve positioner when the valve positioner is attached to the mounting portion, and
      a second set of connection points configured to connect to at least an air supply and a pneumatic actuator,
      the manifold thereby enabling the control valve positioner to be pneumatically connected to the air supply and the pneumatic actuator.

2. The device of claim 1, further comprising an aperture disposed within the mounting portion to allow passage of a feedback linkage for mechanically connecting the positioner and the pneumatic actuator.

3. The device of claim 1, wherein the second set of connection points are configured for fixed tubing connections to the air supply and to the pneumatic actuator.

4. The device of claim 1, wherein the first set of connection points are configured to allow manual detachment of the positioner.

5. The device of claim 1, wherein the mounting portion includes a base plate in which an index aperture is disposed, the index aperture including a base portion that narrows toward the manifold.

6. A control valve positioner assembly configured to enable rapid exchange of a control valve positioner into and out of the assembly, comprising:
   the control valve positioner mounting device of claim 1; and
   a control valve positioner attachable to the control valve positioner mounting device.

7. The assembly of claim 6, further comprises a back plate attached to a coupling side of the positioner and configured to engage with the base plate of the mounting portion.

8. The assembly of claim 7, wherein the back plate includes a flange and the mounting portion includes a slot disposed between the base plate and at least a portion of the manifold, the flange being configured to be received within the slot when the positioner is mounted to the mounting portion and the ports of the positioner contact the first set of connection points of the manifold.

9. The assembly of claim 7, wherein the back plate includes an index pin, and wherein the base plate includes a corresponding index aperture with a base portion that narrows toward the manifold to provide for centering of the index pin.

10. The assembly of claim 7, wherein a first fastening member is attached to the base plate and a second fastening member is attached to the back plate, the first and second fastening members being arranged so as to contact one another when the positioner is mounted to the mounting portion.

11. The assembly of claim 10, further comprising one or more fasteners configured to pass through each of the first and second fastening members to thereby join the first and second fastening members and hold the positioner in a mounted position.

12. The assembly of claim 6, wherein the base plate is configured to allow the positioner to be slidably moved across the base plate toward the manifold.

13. The assembly of claim 6, further comprising a signal connector attached to the positioner and having a fitting for receiving electrical connections.

14. The assembly of claim 13, wherein the fitting is a quick connect fitting or a pin connector.

15. The assembly of claim 6, further comprising a passive memory device having stored thereon backup positioner/controller configuration settings.

16. The assembly of claim 15, further comprising a dock to which the passive memory device is selectively attachable, the dock being positioned on the mounting portion.

17. A control valve system configured to enable rapid exchange of a control valve positioner, the system comprising:
   a valve body;
   a pneumatic actuator assembly operatively coupled to the valve body; and
   a control valve positioner assembly, the control valve positioner assembly including
      a valve positioner; and
      a mounting device configured to receive the valve positioner, the mounting device comprising a base plate and a manifold attached to the base plate, the manifold including a first set of connection points configured to engage with corresponding ports of the valve positioner when the valve positioner is attached to the mounting device, and a second set of connection points configured to connect to at least an air supply and a pneumatic actuator;
   wherein the mounting device is attached to the actuator assembly, and wherein the valve positioner is detachably coupled to the mounting device, the valve positioner thereby being pneumatically connected to the pneumatic actuator assembly via the mounting device.

18. A method of replacing a valve positioner, the method comprising:
   providing a control valve system as in claim 17;
   detecting that the control valve system has a faulty or potentially faulty valve positioner;
   detaching the faulty or potentially faulty valve positioner from the control valve system; and
   attaching a replacement valve positioner to the control valve system.

19. The method of claim 18, wherein detaching the faulty or potentially faulty valve positioner from the control valve system includes uncoupling the faulty or potentially faulty valve positioner from the mounting device to disengage the first set of connection points of the manifold from corresponding pneumatic ports of the faulty or potentially faulty valve positioner, and wherein attaching the replacement valve positioner to the control valve system includes coupling the replacement valve positioner to the mounting device so as to bring the first set of connection points of the manifold into engagement with corresponding pneumatic ports of the replacement valve positioner.

20. The method of claim 18, further comprising configuring the replacement valve positioner using a passive memory device having stored thereon backup positioner information including one or more of identification, setup, tuning, and configuration settings.

\* \* \* \* \*